United States Patent Office 2,987,376
Patented June 6, 1961

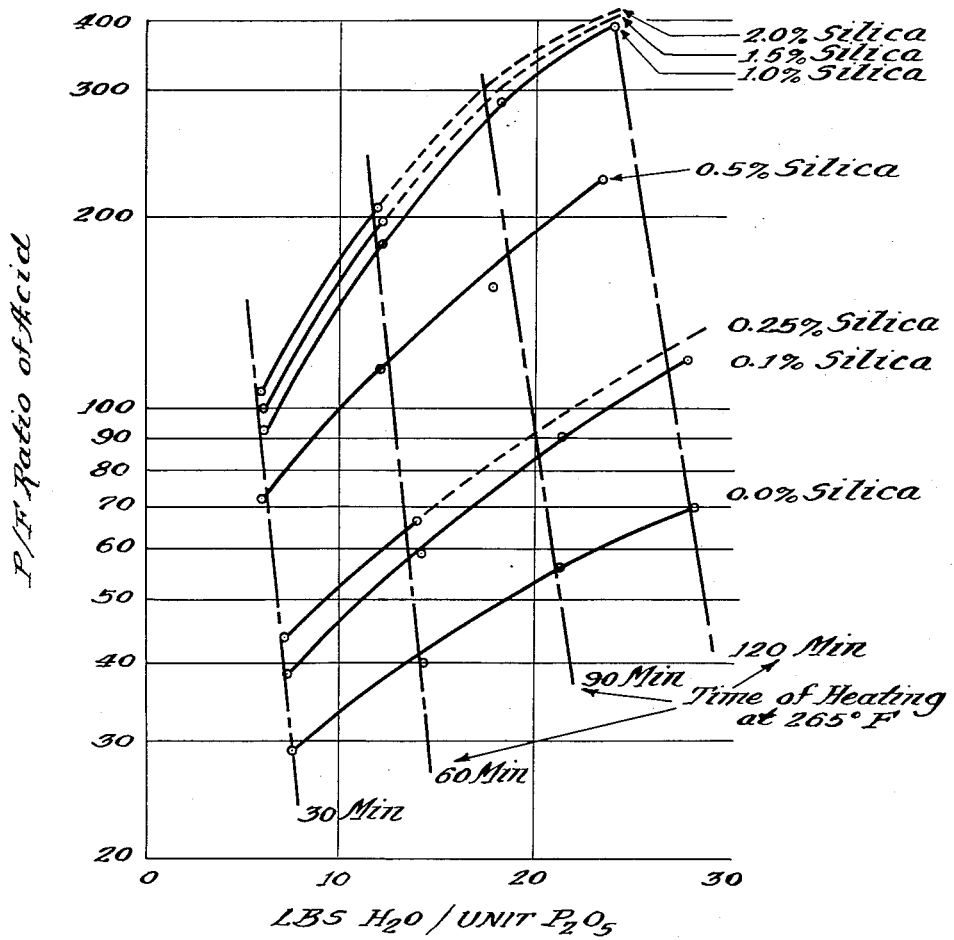

2,987,376
METHOD FOR DEFLUORINATION OF PHOSPHORIC ACID
Gunter H. Gloss, Mundelein, Ill., assignor to International Minerals & Chemical Corporation, a corporation of New York
Filed Dec. 27, 1956, Ser. No. 630,848
12 Claims. (Cl. 23—165)

This invention relates to a new and novel method of removing impurities such as fluorine from acidic phosphate solutions. More particularly, it relates to the production of defluorinated wet process phosphoric acid.

Various grades of so-called superphosphates are produced in commerce. The fluorine content of these superphosphates preclude their use as an animal food supplement material. Phosphates of low fluorine content have been prepared by solubilizing the phosphate values of phosphate rock by reaction with sulfuric acid and treating the resultant aqueous solution with lime to remove impurities prior to precipitation of dicalcium phosphate. This process has the disadvantage that appreciable quantities of $P_2O_5$ values are lost in the precipitate which removes fluorine from solution, thereby diverting phosphate content from relatively high value animal feed product to relatively low valued fertilizer product.

Another method of defluorination heretofore in use has been the passage of super-heated steam through hot phosphoric acid either during the latter stages of concentration or through the concentrated acid. The gases evolved contained predominantly water and carbon dioxide plus small quantities of phosphoric acid, hydrofluoric acid, and silicon tetrafluoride. Recovery of fluorine-bearing material from this mixture is a difficult problem. Hydrofluoric acid tends to polymerize and is difficult to absorb in water even at low temperature. Consequently, recovery of fluorine evolved from solutions is very low. Further, the vapor pressure of HF in an aqueous system is such that absorption at the normal operating temperature for scrubber equipment, i.e., 100° to 200° F., is highly inefficient.

It is a primary object of this invention to overcome the disadvantages and shortcomings of the processes heretofore in use.

It is an object of this invention to provide a process whereby phosphoric acid is more easily and more cheaply defluorinated.

It is another object of this invention to provide a process wherein the fluorine is vaporized in a form rendering it recoverable in the form of fluosilicic acid.

It is still another object to provide a process wherein the fluorine is obtained in a vapor form recoverable in absorbers or scrubbers operating at relatively high temperatures.

It is a further object to provide a process easily controllable for production of $SiF_4$ vapors.

These and other objects will be apparent to those skilled in the art from the following description.

Now it has been discovered that concentrated wet process phosphoric acid of a concentration boiling at a temperature higher than 250° F. can be defluorinated by heating to boiling under conditions permitting little change in volume or acid concentration, in the presence of finely divided or colloidal silica, thereby causing water vapor and silicon tetrafluoride to be evolved, in which form the fluorine compounds are almost completely recoverable in water at temperatures up to about 200° F.

More in detail, phosphoric acid as manufactured by the reaction of phosphate rock with sulfuric acid contains impurities such as $Al_2O_3$, $Fe_2O_3$, CaO and F. A typical chemical analysis of this acid is as follows:

| Constituent: | Wt. Percent |
|---|---|
| $P_2O_5$ | 27.73 |
| F | 1.87 |
| $Al_2O_3$ | 1.26 |
| $Fe_2O_3$ | 1.12 |
| CaO | 0.27 |
| $SO_4$ | 1.3 |
| $SiO_2$ | 0.95 |

Wet process phosphoric acid of this type is usually obtained as an acid of between about 26 and 30% $P_2O_5$ concentration. At this concentration, defluorination by boiling is substantially negligible and the boiling technique herein described is not carried out until the acid has been concentrated to a point giving the acid a boiling point of about 250° F. The dilute phosphoric acid is generally concentrated to have a boiling point in the range between about 250° F. and about 300° F. and preferably in the range between about 255° F. and 275° F.

To drive fluorine from the acid solution, between about 0.3% and about 1.2% by weight of silica is added to the acid and the resulting slurry is heated to its boiling point. During the boiling operation, water is continuously added to the acid solution to maintain a substantially constant boiling mixture, i.e., an acid whose $P_2O_5$ concentration will not fluctuate more than about 3% from the start of boiling until the finish of the heating operation, for example, between about 50 and about 60% corresponding, for this type of acid, to a mixture boiling at 255° F. to about 265° F. An effective boiling rate for evolution of $SiF_4$ requires a continuous introduction of water at a rate corresponding to between about 10 pounds of water per unit of $P_2O_5$ to about 30 pounds of water per unit of $P_2O_5$ per hour of boiling, a unit of $P_2O_5$ meaning 20 pounds.

Fluorine evolution in the form of $SiF_4$ varies almost directly with temperature. Comparable defluorination results are obtainable on acid of the above analysis by heating the silica-containing acid slurry for 30 minutes at 265° F. or for 90 minutes at 250° F.

When boiling acid for a fixed period of time at any particular temperature, the fluorine removal increases as the quantity of silica present is increased from about 0.1% to about 1% by weight. The presence of silica in amounts exceeding 1% produces only slight increase in the amount of fluorine vaporized from the solution. The effect of adding silica is illustrated by the curves in the figure in which the P/F weight ratio of the solution is plotted as the ordinate and the pounds of water added for unit of $P_2O_5$ is plotted as the abscissa. Phosphoric acid of 53% $P_2O_5$ was boiled at a temperature of 265° C. at 30 minute intervals in each instance of data taking. Silica was added in the form of a pulverized material having a surface area of the order of 75 sq. meters per gram. In order to obtain a P/F weight ratio such that upon precipitation of the phosphate values in calcium phosphate form, the precipitate will have a fluorine content sufficiently low to be acceptable as an animal feed, the phosphate solution must have a P/F higher than about 100 and preferably in the range of 150 to 200. To obtain this degree of defluorination in a commercially feasible time such as 30 minutes, between about 0.5 and 1% of silica must be present in the boiling slurry.

To be effective in removing fluorine from boiling phosphoric acid solutions, silica must be in a colloidal or semi-colloidal form. Gelatinous silica such as may be precipitated from fluosilicic acid solutions is an effective form of silica. Finely divided forms of silica such as diatomaceous earth are effective for converting the fluorine content of the acid to silicon tetrafluoride which will be vaporized from the solution along with water. In order to be effective, finely divided silica must have a surface area in excess of about 25 sq. meters per gram and preferably in the range between about 50 and 100 sq. meters per gram. Other useful forms of solid silica are micronized sand and powdered rock materials of a relatively high silica content such as perlite. The purity of the silica material has a marked effect upon the degree of defluorination; materials such as perlite are markedly more efficient in fluorine removal than the silicate clays such as bentonite.

The invention will be more fully understood from the following example.

*Example*

Wet process phosphoric acid (400 parts by weight) having a $P_2O_5$ content of approximately 27.7% by weight, a fluorine content of 1.9%, and a P/F ratio of approximately 29, was concentrated to 58% $P_2O_5$. To the concentrate were added 4 parts by weight of silica having 60 sq. meters of surface per gram of product, the added material being a material precipitated during the absorption of den gases in water. The resulting slurry was agitated and heated to boiling at 265° F. When boiling occurred, water addition was started and continued until the end of the boiling period of 60 minutes at a water rate of 12 pounds of water per unit of $P_2O_5$ in solution. At the end of 60 minutes, the acid concentration was approximately 58% $P_2O_5$. Analysis of the product acid was as follows:

| Constituent: | Wt. percent |
|---|---|
| $P_2O_5$ | [1] 58 |
| P/F | 200 |
| F | 0.13 |

[1] (=25.4% P).

Having thus described my invention, what I claim is:

1. The method of removing fluorine from wet process phosphoric acid containing fluorine in undesirable amounts which comprises heating said acid at a concentration having a boiling point higher than about 250° F. to a boiling temperature in the presence of in excess of about 0.1% by weight of silica having a surface area in excess of 25 square meters per gram, boiling the resultant acid slurry whereby water vapor and silicon tetrafluoride are vaporized and removed while continuously adding water to maintain a substantially constant boiling composition boiling higher than about 250° F., withdrawing a phosphoric acid-silica slurry from the boiling operation having a P/F weight ratio in excess of 100, and removing silica from the defluorinated acid.

2. The method of claim 1 wherein the silica is a diatomaceous earth.

3. The method of removing fluorine from wet process phosphoric acid containing fluorine in undesirable amounts which comprises heating said acid at a concentration having a boiling point higher than about 250° F. to a boiling temperature, adding to the boiling acid silica having a surface area in excess of 25 square meters per gram in a proportion in excess of about 0.1% by weight of the resultant acid slurry, boiling the acid slurry, whereby water vapor and silicon tetrafluoride are vaporized and removed while continuously adding water to maintain a substantially constant boiling composition boiling higher than about 250° F., withdrawing a phosphoric acid-silica slurry from the boiling operation having a P/F weight ratio in excess of 100, and removing silica from the defluorinated acid.

4. The method of claim 3 wherein the added silica is a diatomaceous earth.

5. The method of removing fluorine from wet process phosphoric acid containing fluorine in undesirable amounts which comprises heating said acid at a concentration having a boiling point in the range between about 250° F. and about 300° F. to a boiling condition, adding to the boiling acid silica having a surface area in excess of 25 square meters per gram in a proportion in excess of about 0.1% by weight of the resultant acid slurry, boiling the acid slurry, whereby water vapor and silicon tetrafluoride are vaporized and removed while continuously adding water to maintain a substantially constant boiling composition boiling higher than about 250° F., withdrawing a phosphoric acid-silica slurry from the boiling operation having a P/F weight ratio in excess of 100, and removing silica from the defluorinated acid.

6. The method of removing fluorine from wet process phosphoric acid containing fluorine in undesirable amounts which comprises heating said acid at a concentration having a boiling point in the range between about 255° F. and about 275° F. to a boiling condition, adding to the boiling acid silica having a surface area in excess of 25 square meters per gram in a proportion between about 0.1% and about 1% by weight of the resultant acid slurry, boiling the acid slurry, whereby water vapor and silicon tetrafluoride are vaporized and removed while continuously adding water to maintain a substantially constant boiling composition boiling higher than about 250° F., withdrawing a phosphoric acid-silica slurry from the boiling operation having a P/F weight ratio in excess of 100, and removing silica from the defluorinated acid.

7. The method of removing fluorine from wet process phosphoric acid containing fluorine in undesirable amounts which comprises heating said acid at a concentration having a boiling point higher than about 250° F. to a boiling temperature, adding to the boiling acid silica having a surface area in the range between about 50 and about 100 square meters per gram in a proportion in excess of about 0.1% by weight of the resultant acid slurry, boiling the acid slurry, whereby water vapor and silicon tetrafluoride are vaporized and removed while continuously adding water to maintain a substantially constant boiling composition boiling higher than about 250° F., continuously removing said water vapor and silica tetrafluoride until the P/F weight ratio of said slurry is in excess of 100, withdrawing a phosphoric acid-silica slurry from the boiling operation having a P/F weight ratio in excess of 100, and removing silica from the defluorinated acid.

8. The method of removing fluorine from wet process phosphoric acid containing fluorine in undesirable amounts which comprises heating said acid at a concentration having a boiling point higher than about 250° F. to a boiling temperature, adding to the boiling acid silica having a surface area in excess of 25 square meters per gram and freshly precipitated from fluosilicic acid solution in a proportion in excess of about 0.1% by weight of the resultant acid slurry, boiling the acid slurry, whereby water vapor and silicon tetrafluoride are vaporized and removed while continuously adding water to maintain a substantially constant boiling composition, boiling higher than about 250° F., continuously removing said water vapor and silica tetrafluoride until the P/F weight ratio of said slurry is in excess of 100, withdrawing a phosphoric acid-silica slurry from the boiling operation having a P/F weight ratio in excess of 100, and removing silica from the defluorinated acid.

9. The method of removing fluorine from wet process phosphoric acid containing fluorine in undesirable amounts which comprises heating said acid at a concentration having a boiling point higher than about 250° F. to a boiling temperature, adding to the boiling acid silica having a surface area in excess of 25 square meters per gram in a proportion in excess of about 0.1% by weight of the resultant acid slurry, boiling the acid slurry, whereby water vapor and silicon tetrafluoride are vaporized and removed while continuously adding water to maintain a substantially constant boiling composition boiling higher than about 250° F., continuously removing said water vapor and said silicon tetrafluoride until the P/F weight ratio of said slurry is in excess of 100, withdrawing a phosphoric acid-silica slurry from the boiling operation having a P/F weight ratio in excess of 100, and removing silica from the defluorinated acid, and returning the separated silica plus additional fresh silica to the boiling operation in quantities to maintain up to 1% by weight in the resultant acid slurry.

10. The method of removing fluorine from wet process phosphoric acid containing fluorine in undesirable amounts which comprises heating said acid at a concentration having a boiling point higher than about 250° F. to a boiling temperature, adding to the boiling acid silica having a surface area in excess of 25 square meters per gram in a proportion in excess of about 0.1% by weight of the resultant acid slurry, whereby water vapor and silicon tetrafluoride are vaporized and removed while continuously adding water at a rate between 10 and 30 pounds per unit of $P_2O_5$ per hour of boiling, continuously removing said water vapor and said silicon tetrafluoride until the P/F weight ratio of said slurry is in excess of 100, withdrawing slurry from the boiling operation having a P/F weight ratio in excess of 100, and removing silica from the defluorinated acid, and returning the separated silica plus additional fresh silica to the boiling operation in quantities to maintain up to 1% by weight in the resultant acid slurry.

11. The method of removing fluorine from wet process phosphoric acid containing fluorine in undesirable amounts which comprises heating said acid at a concentration having a boiling point higher than about 250° F. to the boiling temperature, adding to the boiling acid silica having a surface area in excess of about 25 square meters per gram in a proportion in excess of about 0.1% by weight of the resultant acid slurry, boiling the acid slurry, whereby water vapor and silicon tetrafluoride are vaporized and removed while continuously adding water to said slurry to maintain a substantially constant boiling composition boiling higher than about 250° F., and withdrawing a phosphoric acid-silica slurry from the boiling operation having a P/F weight ratio in excess of 100.

12. The method of claim 11 wherein said added silica is a diatomaceous earth.

References Cited in the file of this patent

UNITED STATES PATENTS

| | | |
|---|---|---|
| 1,858,203 | Fiske et al. | May 10, 1932 |
| 2,132,349 | Booth | Oct. 4, 1938 |
| 2,165,100 | Hettrick | July 4, 1939 |
| 2,354,177 | Kawecki | July 18, 1944 |
| 2,526,776 | Smith et al. | Oct. 24, 1950 |
| 2,726,928 | Hollingsworth | Dec. 13, 1955 |